Sept. 22, 1959  M. A. PANICO  2,904,987
BURGLARY PROOF LOCK FOR AUTO STEERING WHEELS
Filed July 19, 1957  2 Sheets-Sheet 2

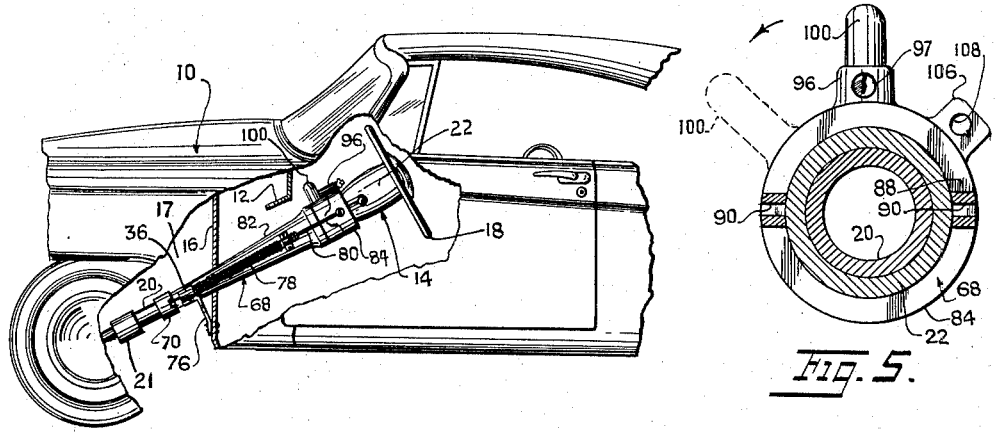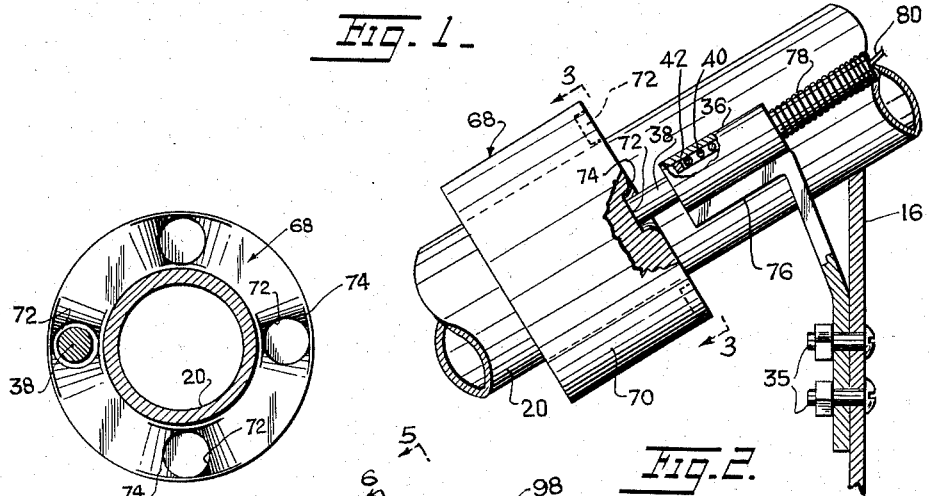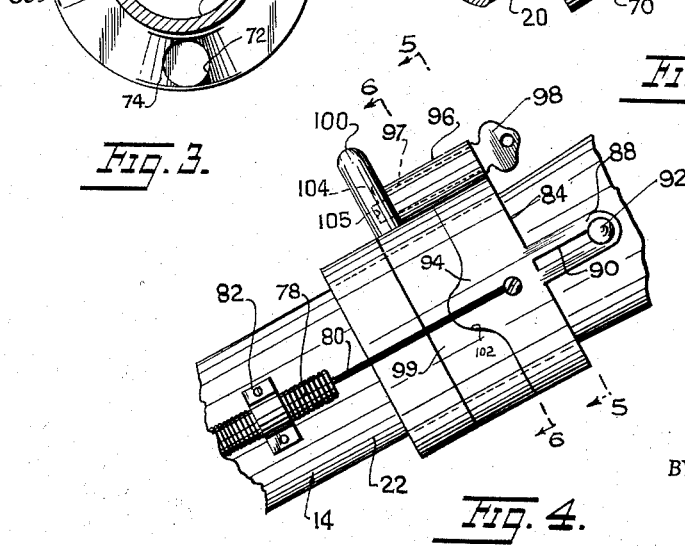

INVENTOR.
MICHEL A. PANICO
BY
ATTORNEY

United States Patent Office 2,904,987
Patented Sept. 22, 1959

2,904,987

BURGLARY PROOF LOCK FOR AUTO STEERING WHEELS

Michel A. Panico, New York, N.Y.

Application July 19, 1957, Serial No. 673,045

1 Claim. (Cl. 70—185)

This invention relates to a device designed to lock the steering wheel of an automobile or other vehicle, whenever said vehicle is not in use. In this way it is proposed to prevent theft or other unauthorized use of the vehicle.

The main object of the present invention is to provide an improved lock of the character described, which will be key-operated, so as to insure to the maximum extent against unlocking of the device by unauthorized individuals.

Another object is to provide a lock as described formed to permit its swift attachment to a conventional steering mechanism, without modification or redesign of said mechanism.

A further object is to permit remote control of the lock, from the instrument panel of the vehicle or from the upper portion of the steering column, through the use of a novel cable-operating mechanism particularly well designed to be controlled by a conventional rotatable lock cylinder.

A further object is to provide an effective lock that will engage the steering shaft against rotation almost instantly, as the steering shaft begins to turn in either direction, assuming, of course, that the device has been operated to locking position. In this way, it is proposed to permit the steering shaft to be locked with the front wheels in any of various positions, including positions in which the front wheels are sharply turned for the purpose of preventing accidental rolling of the vehicle down a hill.

Still another object is to provide, in a device as stated, a construction which will minimize the possibility of tampering with the lock device, due to its being disposed at a relatively inaccessible location within the engine compartment.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a fragmentary side elevational view of an automobile in which a portion of the vehicle has been broken away and other portions are shown in section, the device consisting the present invention being illustrated in side elevation, in position mounted upon a steering column.

Fig. 2 is an enlarged fragmentary side elevational view of the steering shaft and associated locking device, parts being shown broken away.

Fig. 3 is a sectional view taken on the plane of the line 3—3 of Fig. 2.

Fig. 4 is a fragmentary, enlarged, side elevational view of the upper portion of the steering column showing the control mechanism.

Fig. 5 is an enlarged transverse sectional view on line 5—5 of Fig. 4, the dotted lines showing the unlocked position of the control means.

Figure 7:
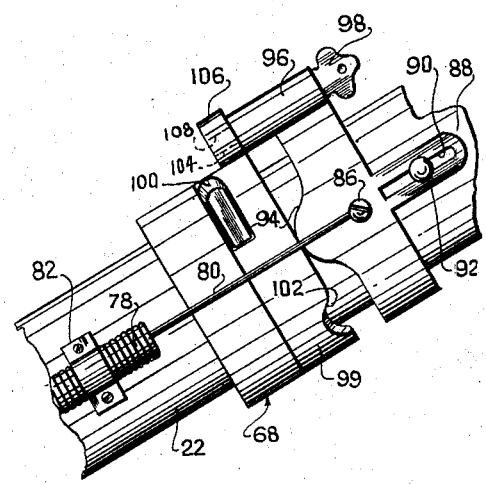
Fig. 7 is a view similar to Fig. 4 in which the control mechanism has been adjusted to an unlocking position.
Figure 6:
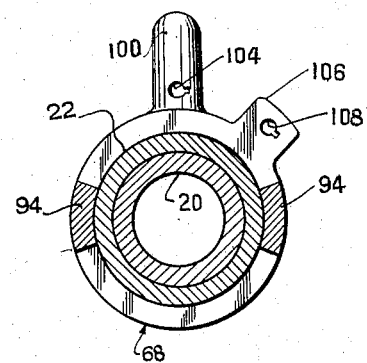
Fig. 6 is a transverse sectional view on the same scale as Fig. 4, taken on line 6—6 of Fig. 4.

Referring to the drawings in detail, in the form of the invention shown in Figs. 1–6, the device has been illustrated mounted within a conventional automobile generally designated 10 having the usual instrument panel 12, steering column 14, and fire wall 16 through which the steering column extends into an engine compartment 17.

The steering column includes the steering wheel 18, secured to and rotating a steering wheel shaft 20 having a connection 21 to the steering linkages that extend to the front wheels. Shaft 20 extends through a tubular housing 22.

The invention includes a locking device generally designated at 68. The locking device comprises a ring 70 welded or otherwise fixedly secured to shaft 20 in a shaft-encircling position.

At opposite sides of the ring 70, in closely spaced relation thereto, mounting brackets 76 are fixedly secured within engine compartment 17 to fire wall 16, through the provision of a plurality of bolts 35. Brackets 76 have ledge portions to which are welded coaxially aligned cylinders 36, the opposite ends of which have end walls formed with openings in which plungers 38 are slidable axially of the cylinders.

Lock ring 70 has a series of circumferentially spaced cylindrical locking recesses 72 formed entirely in one end surface of the ring. Recesses 72 are in communication with shallow depressions 74. Referring to Fig. 3, recesses 72 are somewhat greater in diameter than plungers 38, but could be of a diameter almost equal to plungers 38, if desired. Depressions 74 have surfaces of ramp-like formation, extending in arcuate paths concentric with the steering shaft. Thus, a plunger 38 engaged against the end surface of the ring will be caused to travel along said end surface to eventually move into a ramp-like depression 74 and thence into a recess 72.

Again the recesses are angularly spaced about the circumference of the locking ring and are extended in parallel relation to each other and to the length of the steering shaft 20.

Compression coil springs 40 within cylinders 36 abut at one end against collars 42 rigid with plungers 38. At their other ends, the plungers project beyond the outer ends of the cylinders and are formed with apertures through which extend the opposite ends of an elongated steel cable 80 reciprocable within the flexible housing. The cable is a conventional Bowden cable, and obviously, when the ends of the cable 80 are pulled in a direction away from the ring 70, viewing the same as in Fig. 2, plungers 38 will be retracted from their associated recesses 72 against the restraint of the springs 40.

Since the plungers are to extend parallel to the inclined steering shaft 20, the mounting brackets 76 to which cylinders 36 are secured fixedly have ledge portions that are correspondingly inclined.

Fixedly secured to the cylinders 36 are flexible cable housings 78, and axially shiftable within said cable housings are cables 80 which extend along opposite sides of the steering column, within their associated housings, as best shown in Figs. 1 and 4.

Housings 78, at a location adjacent the steering wheel 18, are clamped to diametrically opposite portions of housing 22 by clamping brackets 82 secured to the housing. Cables 80 project at this point out of the housings 78 and are connected to a cable-shifting ring 84 by means of screws 86 or the like. Screws 86 are attached to ring 84 at diametrically opposite locations on the ring and in alignment within cables 80 are elongated arms 88 projecting toward the steering wheel from ring 84 and formed with slots 90 arranged longitudinally of the cables. Extending through the slots are headed lugs 92 fixedly attached to housing 22.

Ring 84 is thus mounted for slidable movement upon housing 22 between a normal, locking position shown in Fig. 4 and an unlocking position shown in Fig. 7.

The ring is held against rotation while being guided for straight line movement, by lugs 92 extending through slots 90.

Integrally formed upon ring 84 in alignment with the arms 88 and cables 80 are rounded projections or humps 94 forming cams. Equidistantly spaced from projections 94, at the top of ring 84, is a barrel 96 fixedly secured to ring 84 and having in it a rotatable lock cylinder 97, the rotation of which is controlled by key 98.

A rotatable operating ring 99 is adapted to freely turn upon housing 22. Integral with and projecting radially outwardly from ring 99 is a handle 100 whereby one may turn ring 99 from its normal, locking position shown in Fig. 4 and in full lines in Fig. 5 to its unlocking position shown in full lines in Fig. 7 and in dotted lines in Fig. 5. Ring 99 is engaged at its rear against axial movement away from ring 84, by a stationary stop collar on housing 22.

One edge of ring 99 abuts the adjacent edge of shift ring 84. This edge of ring 99 has rounded depressions 102 mating with cams 94. Thus, in one position of ring 99, this being the locking position thereof, depressions 102 receive cams 94. At this time a locking projection 104 on cylinder 97 extends into a recess provided in the handle 100 to lock ring 99 against rotatable movement. Projection 104 has a locking lug 105 offset at this time from a radial slot extending from the recess of the handle. Cylinder 97 with its projection 104 is of the type adapted to automatically move axially in a direction to the right in Fig. 4 when the key 98 is turned to unlocking position and lug 105 is registered with the radial slot. Therefore, lug 104 is retracted from the recess of handle 100.

Referring now to Fig. 5, angularly spaced from handle 100 is a radial projection 106 integral with ring 99 and having a recess 108. Projection 106 is offset forwardly from handle 100 axially of ring 99.

In use of this locking device, one first unlocks handle 100. Lug 104 retracts automatically.

Handle 100 is turned by the vehicle operator from its full to its dotted line position of Fig. 5. This causes cams 94 to be biased out of depressions 102 by the sloped walls of said depressions, so that the cams now ride upon the unrecessed portions of ring 99 as shown in Fig. 7.

This, of course, biases ring 84 toward the steering wheel, axially of the steering shaft. Therefore, cables 80 are pulled to retract plungers 38 against the restraint of their associated springs, out of engagement with locking ring 74. Therefore, the steering mechanism is unlocked to permit operation of the vehicle.

Turning of the ring 99 to its Fig. 7 position brings projection 106 into registration with the lock cylinder, and one may now turn key 98 back to its locking position. Projection 104 thus is extended once again, and therefore will engage in the recess 108 of projection 106 even though ring 84 has been axially shifted away from ring 99. The purpose of this, of course, is to lock the ring 99 against accidental rotation from its unlocking to its locking position.

This is desirable since one might strike handle 100 accidentally while driving the vehicle. This could have serious results, of course, if the device were to accidentally lock while the vehicle is in operation.

While I have illustrated and described the preferred embodiment of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A safety lock for a steering mechanism of a vehicle, said mechanism including a steering column and the steering column including a tubular housing and a steering shaft rotatable in said housing, said lock comprising: a lock ring rigidly connected to said shaft for rotation therewith, means releasably engageable with said ring in selected positions to which the ring is rotated, so as to hold the shaft against rotation, and means connected with the first-named means adapted for operating the first-named means from a location remote from the lock ring, to free the lock ring and steering shaft for conjoint rotatable movement, said ring being formed with a plurality of recesses arranged in circumferentially spaced relation in the ring, said recesses being selectively registrable with the first-named means for receiving the first-named means to effect said engagement of the ring against rotation, said first-named means comprising a pair of diametrically opposed plungers proportioned for engagement in the recesses, said recesses being arranged in pairs with the recesses of each pair being diametrically opposite one another to receive the respective plungers when the recesses of a selected pair are registered with the plungers, the second-named means including wires connected to the respective plungers for retracting the same, said wires extending to the passenger compartment of the vehicle, said plungers being spring-biased toward the ring for normally engaging in the recesses, said second-named means including a ring slidable upon the steering column and connected to the wires for pulling the wires on sliding of the ring in one direction, and key-controlled means rotatably mounted upon the steering column in engagement with the wire-attached ring for shifting the same in a direction to cause pull to be exerted on the wires.

References Cited in the file of this patent
UNITED STATES PATENTS

| | | |
|---|---|---|
| 1,176,500 | Torrence | Mar. 21, 1916 |
| 1,776,265 | Martel | Sept. 23, 1930 |
| 1,827,732 | Conlan | Oct. 20, 1931 |
| 1,857,654 | Mylar | May 10, 1932 |
| 1,912,945 | Leiva | June 6, 1933 |
| 2,153,916 | Dunbar | Apr. 11, 1939 |
| 2,295,723 | Duncan | Sept. 15, 1942 |
| 2,446,828 | Hamer | Aug. 10, 1948 |

FOREIGN PATENTS

| | | |
|---|---|---|
| 262,325 | Great Britain | Dec. 6, 1926 |
| 1,123,715 | France | June 18, 1956 |